US012749704B2

(12) United States Patent
Yoon et al.

(10) Patent No.: US 12,749,704 B2
(45) Date of Patent: Sep. 29, 2026

(54) SOLID-STATE ELECTROLYTE MATERIAL AND SOLID-STATE BATTERY UTILIZING THE SAME

(71) Applicant: Samsung Electronics Co., Ltd., Suwon-si (KR)

(72) Inventors: Gabin Yoon, Suwon-si (KR); Yan Wang, Brookline, MA (US); Samuel Cross, Cambridge, MA (US); Mahdi Amachraa, Cambridge, MA (US); Hyeokjo Gwon, Hwaseong-Si (KR); Doh Won Jung, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 746 days.

(21) Appl. No.: 18/149,635

(22) Filed: Jan. 3, 2023

(65) Prior Publication Data

US 2023/0420729 A1 Dec. 28, 2023

Related U.S. Application Data

(60) Provisional application No. 63/354,606, filed on Jun. 22, 2022.

(51) Int. Cl.

| | |
|---|---|
| ***H01M 10/0562*** | (2010.01) |
| ***C01G 25/00*** | (2006.01) |
| ***H01M 10/0585*** | (2010.01) |

(52) U.S. Cl.

CPC ...... *H01M 10/0562* (2013.01); *C01G 25/006* (2013.01); *H01M 10/0585* (2013.01); *C01P 2002/50* (2013.01); *C01P 2002/77* (2013.01); *C01P 2006/40* (2013.01); *H01M 2300/0071* (2013.01)

(58) Field of Classification Search

None

See application file for complete search history.

(56) References Cited

U.S. PATENT DOCUMENTS

| | | | | |
|---|---|---|---|---|
| 10,770,751 | B2 * | 9/2020 | Wang | H01M 4/628 |
| 10,910,646 | B2 | 2/2021 | Kumakura et al. | |
| 11,108,080 | B2 | 8/2021 | Wang et al. | |
| 11,444,318 | B2 * | 9/2022 | Wang | H01M 10/4235 |
| 11,575,152 | B2 * | 2/2023 | Kim | H01M 4/366 |

(Continued)

FOREIGN PATENT DOCUMENTS

| | | | |
|---|---|---|---|
| JP | 5903956 B2 * | 4/2016 | C01G 53/50 |

OTHER PUBLICATIONS

Abstract of JP 59-03956 B2 (Year: 2016).*

(Continued)

*Primary Examiner* — Kevin M Bernatz

(74) *Attorney, Agent, or Firm* — CANTOR COLBURN LLP

(57) ABSTRACT

A compound represented by Formula 1:

$$Li_{4+d}H_h^+Sr_{2-x}M1_x^{a+}Zr_{1-y}M2_y^{b+}O_{6-z}X_z^{c-},$$

wherein in Formula 1, M1 is a cationic dopant in Sr site with a valance of a+; a is 1, 2 or 3; M2 is a cationic dopant in Zr site with a valance of b+; b is 2, 3, 4 or 5; X is an anion dopant in O site with a valence of c−; c is 1, 2, or 3; 0≤h≤2, 0≤x≤2, 0≤y≤1, 0≤z≤0.5, x+y+z+h≥0, d=(2−a)*x+(4−b)*y−(2−c)*z−h, and d≥0.

19 Claims, 5 Drawing Sheets

(56) References Cited

U.S. PATENT DOCUMENTS

| | | | | |
|---|---|---|---|---|
| 11,611,103 | B2 * | 3/2023 | Kim | H01M 4/366 |
| 11,876,225 | B2 * | 1/2024 | Jun | H01M 4/525 |
| 12,206,068 | B2 * | 1/2025 | Kataoka | H01B 1/08 |
| 2020/0020942 | A1 | 1/2020 | Han et al. | |
| 2020/0259211 | A1 | 8/2020 | Sakamoto et al. | |
| 2022/0006116 | A1 | 1/2022 | Choi et al. | |
| 2022/0044837 | A1 * | 2/2022 | Gwon | H01B 13/0016 |
| 2022/0149426 | A1 | 5/2022 | Yoon et al. | |
| 2022/0158225 | A1 * | 5/2022 | Choi | H01M 10/0562 |
| 2022/0166054 | A1 | 5/2022 | Wang et al. | |
| 2022/0166055 | A1 * | 5/2022 | Wang | H01M 4/134 |
| 2022/0166057 | A1 | 5/2022 | Choi et al. | |
| 2023/0378527 | A1 * | 11/2023 | Kataoka | C01G 35/006 |
| 2024/0003052 | A1 * | 1/2024 | Kataoka | C30B 13/14 |
| 2024/0097184 | A1 * | 3/2024 | Cross | H01M 10/0562 |

OTHER PUBLICATIONS

European Search Report for EP Application No. 23180576.3 dated Nov. 20, 2023, 6 pages.

Kunimitsu Kataoka et al., Discovery of the Li—Sr—La—Zr—O Compound and the Investigation of Its Lithium-Ion Conductivity, Inorganic Chemistry, 2022, ACS Publishing, American Chemical Society. https://doi.org/10.1021/acs.inorgchem.2c00373.

* cited by examiner

SOLID-STATE ELECTROLYTE MATERIAL AND SOLID-STATE BATTERY UTILIZING THE SAME

CROSS-REFERENCE TO RELATED APPLICATION

The present application claims priority to and the benefit of U.S. Provisional Application No. 63/354,606, filed on Jun. 22, 2022, the entire content of which is incorporated herein by reference.

FIELD

The present disclosure relates generally to a material for solid-state electrolyte and a solid-state battery including the same.

BACKGROUND

Conventional batteries with a liquid electrolyte may be prone to problems such as leakage and ignition of the electrolyte. In order to improve safety, solid-state batteries (also referred to as all-solid-state batteries) including a solid-state electrolyte have gained attention as the next generation batteries. However, there remains a need to resolve the issue of detachment of the solid-state electrolyte from the anode in solid-state batteries.

The above information disclosed in this Background section is only for enhancement of understanding of the background of the invention and therefore it may contain information that does not constitute prior art.

SUMMARY

Aspects according to one or more embodiments of the present invention are directed toward a compound for solid-state electrolyte with suitable ionic conductivity and stability against lithium (Li) metal, and a solid-state battery including the same.

Additional aspects will be set forth in part in the description which follows and, in part, will be apparent from the description, or may be learned by practice of the presented embodiments of the disclosure.

According to one or more embodiments of the present disclosure, a compound is represented by Formula 1:

$$Li_{4+d}H_h^{+}Sr_{2-x}M1_x^{a+}Zr_{1-y}M2_y^{b+}O_{6-z}X_z^{c-}, \quad \text{Formula 1}$$

wherein in Formula 1, $M1$ is cationic dopant in $Sr$ site with a valance of $a+$;

$a$ is 1, 2, or 3;

$M2$ is cationic dopant in $Zr$ site with a valance of $b+$;

$b$ is 2, 3, 4, or 5;

$X$ is an anion dopant in $O$ site with a valence of $c-$;

$c$ is 1, 2, or 3;

$$0 \le h \le 2,\ 0 \le x \le 2,\ 0 \le y \le 1,\ 0 \le z \le 0.5,\ x+y+z+h \ge 0,$$

$$d = (2-a)^{*}x + (4-b)^{*}y - (2-c)^{*}z - h, \text{ and}$$

$$d \ge 0.$$

In some embodiments, d>0.

In some embodiments, a stoichiometric ratio between Li and Zr represented by (4+d):(1−y) is greater than 4:1.

In some embodiments, a stoichiometric ratio between Li and O represented by (4+d):(6−z) is greater than 4:6.

In some embodiments, 0<x≤2.

In some embodiments, 0<y≤1.

In some embodiments, M1 is $Na^{1+}$, $K^{1+}$, $Rb^{1+}$, $Cs^{1+}$, $Fr^{1+}$, $Ca^{2+}$, $Ba^{2+}$, $Mg^{2+}$, $Zn^{2+}$, $Be^{2+}$, $Ra^{2+}$, $In^{3+}$, $Sc^{3+}$, $Y^{3+}$, $Al^{3+}$, $Ga^{3+}$, $B^{3+}$, or any combination thereof.

In some embodiments, M2 is $Ca^{2+}$, $Ba^{2+}$, $Mg^{2+}$, $Zn^{2+}$, $Be^{2+}$, $Y^{3+}$, $In^{3+}$, $Sc^{3+}$, $B^{3+}$, $Al^{3+}$, $Ga^{3+}$, $Ce^{3+}$, $Pr^{3+}$, $Nd^{3+}$, $Gd^{3+}$, $Ti^{4+}$, $Sn^{4+}$, $Si^{4+}$, $Ge^{4+}$, $Pb^{4+}$, $Bi^{5+}$, $Sb^{5+}$, $P^{5+}$, $As^{5+}$, $Nb^{5+}$, $Ta^{5+}$, or any combination thereof.

In some embodiments, X is $F^{1-}$, $C^{1-}$, $Br^{1-}$, $I^{1-}$, $N^{3-}$, or any combination thereof.

In some embodiments, the compound has an ionic conductivity of about 0.3 mS/cm or greater at room temperature.

In some embodiments, a is 1 or 2 and b is 2, 3, or 4.

In one or more embodiments, a solid-state electrolyte includes the compound. In one or more embodiments, an electrochemical cell includes: an anode comprising a lithium metal, a cathode facing the anode, and a solid-state electrolyte between the anode and the cathode, the solid-state electrolyte comprising the compound. In one or more embodiments, a method of manufacturing the compound includes:

combining a lithium source with two or more selected from the group consisting of a strontium source, a zirconium source, a source of M1, a source of M2 and a source of X, to form a mixture, and heat treating the mixture to manufacture the compound.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and enhancements of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
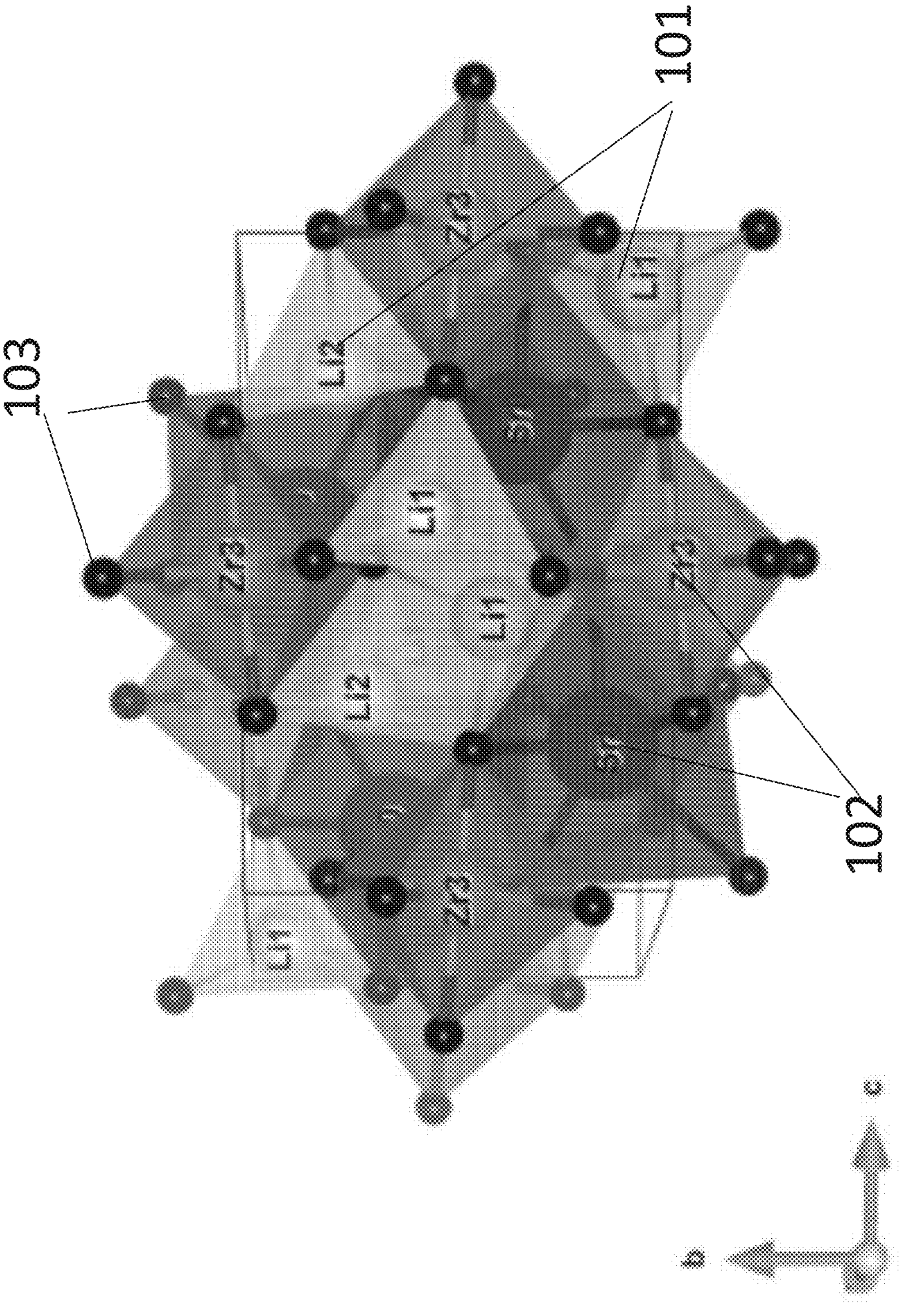
FIG. 1 is a schematic illustration of a crystal structure of a compound for a solid-state electrolyte according to an embodiment of the present disclosure.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein.

Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein. The term "diameter" as used herein may refer to the diameter of a circular or spherical shape, or the equivalent diameter of a non-circular or non-spherical shape.

A related art solid-state battery includes a cathode, an anode, and a solid-state electrolyte (SSE) between the cathode and the anode and in direct contact with the cathode and the anode. The anode may include lithium metal. Therefore, it is desirable for the solid-state electrolyte to have both high ionic conductivity and also lithium stability (e.g., concurrently).

According to embodiments of the present disclosure, a compound for solid-state electrolyte is represented by Formula 1.

$$Li_{4+d}H_h^{+}Sr_{2-x}M1_x^{a+}Zr_{1-y}M2_y^{b+}O_{6-z}X_z^{c-} \quad \text{Formula 1}$$

In Formula 1, Li represents lithium, H represents hydrogen, Sr represents strontium, Zr represents zirconium, O represents oxygen; M1 may be a cationic dopant in strontium (Sr) site with a valance of a+; a maybe 1, 2, or 3; M2 may be a cationic dopant in zirconium (Zr) site with a valance of b+; b may be 2, 3, 4, or 5; X may be an anion dopant to oxygen (O) site with a valence of c−; c may be 1, 2, or 3; $0 \leq h \leq 2$, $0 \leq x \leq 2$, $0 \leq y \leq 1$, $0 \leq z \leq 0.5$, $x+y+z+h \geq 0$, $d=(2-a)*x+(4-b)*y-(2-c)*z-h$, and $d \geq 0$.

The compound represented by Formula 1 includes lithium at a stoichiometry of 4 or greater while the stoichiometry of zirconium (Zr) is 1 or less and the stoichiometry of is 6 or less. That is, in the compound represented by Formula 1, lithium is included at a stoichiometry of no less than 4.

In some embodiments, in Formula 1, d may be greater than 0, and the stoichiometry of Li may be greater than 4. For example, d may be 0.01 or greater, 0.05 or greater, 0.1 or greater, 0.2 or greater, 0.3 or greater, 0.4 or greater, 0.5 or greater, 0.6 or greater, 0.7 or greater, 0.8 or greater, 0.9 or greater, or between 0.01 to 1.0. In an embodiment, d is 0.1 or greater to 1.0 or less. When d is greater than 0, the compound represented by Formula 1 has excess lithium compared to a base composition $Li_4Sr_2ZrO_6$ (LSZO base compound).

In some embodiments, a stoichiometric ratio between Li and Zr represented by (4+d):(1−y) may be greater than 4:1. In some embodiments, the stoichiometric ratio between Li and Zr may be 6:0.5 (i.e., 12:1) or less. In an embodiment, the stoichiometric ratio between Li and Zr may be 4.1:1, 4.5:1, 4.9:1, 5.0:1, 5.5:1, 6.0:1, 7:0:1, 8.0:1, 9.0:1, 10.0:1, or 11.0:1.

In some embodiments, a stoichiometric ratio between Li and O represented by (4+d):(6−z) may be greater than 4:6. In some embodiments, the stoichiometric ratio between Li and O may be 6:6 (i.e., 1:1) or less. In an embodiment, the stoichiometric ratio between Li and O may be 4.1:6.0, 4.5:6.0, 5.0:6.0, 6.0:6.0, 4.1:5.8, 4.5:5.8, 5.0:5.8, or 5.5:5.5 (i.e., 1:1).

In Formula 1, x represents the stoichiometry of the dopant M1 that is doped at the Sr site. Hereinafter, the expression “a dopant M1 that is doped at the Sr site” refers to that an atom of M1 replaces an atom of Sr at where the atom of Sr would be located in a crystal structure of a base composition $Li_4Sr_2ZrO_6$. In a compound represented by Formula 1, x moles of M1 replaces x moles of Sr at the respective Sr site.

In some embodiments, Sr in Formula 1 has a positive valence of 2, and M1 may be a cationic dopant with a positive valance of 1, 2 or 3. That is, the valence of M1 atoms used to replace a portion of the Sr atoms is one more than, the same as, or less than the valence of Sr. In some embodiments, M1 may be a cationic dopant with a positive valance of 1 or 2. In some embodiments, $0 \leq x \leq 2$, for example, $0<x\leq 1.5$, $0<x\leq 1.2$, $0<x\leq 1.0$, $0<x\leq 0.5$, or $0<x\leq 0.3$. In some embodiments, x is 2, and all of Sr atoms are replaced with M1. In some embodiments, a is 1, and $0\leq x\leq 0.5$. In some embodiments, a is 2, and $0\leq x\leq 1$, for example, $0\leq x\leq 0.9375$. In some embodiments, a is 3, and $0\leq x\leq 0.5$. In some embodiments, b is 3, and $0\leq y\leq 0.5$. In some embodiments, b is 4, and $0\leq y\leq 1$. In some embodiments, b is 5, and $0\leq y\leq 1$, for example, $0\leq y\leq 0.75$.

In some embodiments, M1 may be an alkali metal excluding Li, and/or may be an alkaline earth metal excluding Sr. In some embodiments, M1 may be a monovalent cation, and may be $Na^{1+}$, $K^{1+}$, $Rb^{1+}$, $Cs^{1+}$, $Fr^{1+}$, or any combination thereof. In some embodiments, M1 may be a divalent cation, and may be $Ca^{2+}$, $Ba^{2+}$, $Mg^{2+}$, $Zn^{2+}$, $Be^{2+}$, $Ra^{2+}$, or any combination thereof. In some embodiments, M1 may be a trivalent cation, and may be $In^{3+}$, $Sc^{3+}$, $Y^{3+}$, $Al^{3+}$, $Ga^{3+}$, $B^{3+}$, or any combination thereof. In some embodiments, M1 may be monovalent cation, a divalent cation, a trivalent cation, or any combination thereof. In some embodiments, M1 may be $Na^{1+}$, $K^{1+}$, $Ca^{2+}$, $Ba^{2+}$, or any combination thereof.

In Formula 1, y represents the stoichiometry of the dopant M2 that is doped at the Zr site. Hereinafter, the expression “a dopant M2 that is doped at the Zr site” refers to that an atom of M2 replaces an atom of Zr at where the atom of Zr would be located in a crystal structure of a base composition $Li_4Sr_2ZrO_6$. In a compound represented by Formula 1, y moles of M2 replaces y moles of Zr at the respective Zr site. In some embodiments, Zr in Formula 1 has a positive valence of 4, and M2 may be a cationic dopant with a positive valance of 2, 3, 4 or 5. That is, the valence of M2 atoms used to replace a portion of the Zr atoms is one more than, the same as, or less than the valence of Zr. In some embodiments, M2 may be a cationic dopant with a positive valance of 2, 3 or 4. In some embodiments, $0\leq y\leq 1$, for example, $0\leq y\leq 0.8$, $0\leq y\leq 0.6$, $0\leq y\leq 0.5$, $0\leq y\leq 0.3$, or $0\leq y\leq 0.1$. In an embodiment, y is 0 and the Zr sites are not doped by another material. In an embodiment, y is 1, and all of Zr atoms are replaced with M2.

In some embodiments, M2 may be a divalent cation, a trivalent cation, a tetra valent cation, a pentavalent cation, or any combination thereof. In some embodiments, M2 may be a divalent cation, and may be $Ca^{2+}$, $Ba^{2+}$, $Mg^{2+}$, $Be^{2+}$, $Ra^{2+}$, or any combination thereof. In some embodiments, M2 may be a trivalent cation and may be $Y^{3+}$, $In^{3+}$, $Sc^{3+}$, $B^{3+}$, $Al^{3+}$, $Ga^{3+}$, $Ce^{3+}$, $Pr^{3+}$, $Nd^{3+}$, $Gd^{3+}$, or any combination thereof. In some embodiments, M2 may be a tetravalent cation, and may be $Ti^{4+}$, $Sn^{4+}$, $Si^{4+}$, $Ge^{4+}$, $Pb^{4+}$, or a combination thereof. In some embodiments, M2 may be a pentavalent cation, and may be $Bi^{5+}$, $Sb^{5+}$, $P^{5+}$, $As^{5+}$, $Nb^{5+}$, $Ta^{5+}$, or a combination thereof. In some embodiments, M2 may be $Mg^{2+}$, $Zn^{2+}$, $Y^{3+}$, $In^{3+}$, $Sc^{3+}$, $Ti^{4+}$, $Sn^{4+}$, $Si^{4+}$, $Ge^{4+}$, or any combination thereof.

In Formula 1, z represents the stoichiometry of the anion dopant X that is doped at the O site. Hereinafter, the expression “a dopant X that is doped at the O site” refers to that an atom of X replaces an atom of O at where the atom of O would be located in a crystal structure of a base composition $Li_4Sr_2ZrO_6$. In a compound represented by Formula 1, z moles of X replace z moles of O at the respective O site. In some embodiments, X in Formula 1 has a negative valence of 1, 2, or 3. In some embodiments, $0\leq z\leq 0.5$, for example, $0\leq z\leq 0.4$, $0\leq z\leq 0.3$, $0\leq z\leq 0.2$, or $0\leq z\leq 0.1$. In an embodiment, z is 0 and the O sites are not doped by another material.

In some embodiments, X may be a monovalent anion, such as $F^{1-}$, $Cl^{1-}$, $Br^{1-}$, $I^{1-}$, a trivalent anion, such as $N^{3-}$, or any combination thereof.

In Formula 1, h represents the stoichiometry of hydrogen (H) that is doped at the Li site. Hereinafter, the expression “H that is doped at the Li site” refers to that an atom of H replaces an atom of Li at where the atom of Li would be located in a crystal structure of a base composition $Li_4Sr_2ZrO_6$. In a compound represented by Formula 1, h moles of H replace h moles of Li at the respective Li site. H may be introduced to Li sites after acid treatment during the manufacturing process of the compound for solid-state electrolyte.

In some embodiments, $0\leq h\leq 2$, for example, $0\leq h\leq 1.0$, $0\leq h\leq 0.5$, $0\leq h\leq 0.2$, or $0\leq z\leq 0.1$. In an embodiment, h is 0 and the Li sites are not doped by H.

In some embodiments, at least one of the Sr, Zr or O sites may be doped with a corresponding one of the M1, M2 or X. In an embodiment, the Sr sites are doped with M1. In an embodiment, the Zr sites are doped with M2. In an embodiment, the O sites are doped with X. In an embodiment, both the Sr sites and the Zr sites are concurrently doped by a respective dopant. In an embodiment, both the Sr sites and the O sites are concurrently doped by a respective dopant. In an embodiment, both the Zr sites and the O sites are concurrently doped by a respective dopant. In an embodiment, the Sr sites, Zr sites and the O sites are all concurrently doped by a respective dopant.

In the compound represented by Formula 1, Li is included at a stoichiometry of 4 or more than 4 while the stoichiometry of Zr is 1 or less and the stoichiometry of O is 6 or less. In addition, in one or more embodiments, in the compound represented by Formula 1, a dopant M1 with a valence not more than that of Sr is used to dope the Sr sites. In some embodiments, the compound represented by Formula 1 may further include a dopant M2 with a valence not more than that of Zr doped at the Zr sites. The compound represented by Formula 1 may therefore have suitable ionic conductivity to ensure satisfactory performance of the solid-state battery. In some embodiments, the compound represented by Formula 1 may have an ionic conductivity of about 0.3 mS/cm or greater at 25° C. (e.g., room temperature, RT). In some embodiments, the compound represented by Formula 1 may have an ionic conductivity of about 0.4 mS/cm or greater at 25° C. In a solid-state battery, it is desirable to have a solid-state electrolyte with high ionic conductivity and a wide electrochemical stability window. Oxide-based materials may have suitable air and electrochemical stability and have no toxicity issues, but the related art oxide-based materials usually have low ionic conductivity at about 0.01 mS/cm or lower at about 25° C., mainly due to either low bulk conductivity or high grain-boundary resistance. Among related art oxide-based materials, only garnet $Li_7La_3Zr_2O_{12}$ (LLZO) showed a conductivity of over 1 mS/cm, but it requires delicate handling as an insulating lithium carbonate coating is formed even if it is stored in a glovebox. In addition, compared to $Li_7La_3Zr_2O_{12}$, the compound represented by Formula 1 uses Sr, a relatively lighter element than lanthanum (La). A comparison between La and Sr are shown in Table 1. As shown in Table 1, because La is less in amount on earth, it is also more expensive than Sr. As such, the compound represented by Formula 1 is also cheaper than the related art lithium garnet.

TABLE 1

| Element | Name | Density (Kg/L) | Abundance in Earth's Crust (mg/kg) |
|---|---|---|---|
| La | lanthanum | 6.145 | 39 ($1.08 \times 10^{18}$ kg) |
| Sr | strontium | 2.64 | 370 ($1.025 \times 10^{19}$ kg) |

The compound represented by Formula 1 adopts a $Li_4Sr_2Zr_1O_6$ structure as shown in FIG. 1. Referring to FIG. 1, in the $Li_4Sr_2Zr_1O_6$ type structure, the lithium 101 and the metals 102, e.g., Sr and Zr, are coordinated by oxygen 103. Doped $Li_4Sr_2Zr_1O_6$ materials represented by Formula 1 adopt a similar structure. The dopant M1 in Formula 1 is understood to reside on the Sr sites in this structure and the dopant M2 is understood to reside on the Zr site in this structure. It has been surprisingly discovered that the disclosed compound provides an improved combination of stability against lithium metal and ionic conductivity. While not wanting to be bound by any particular theory, it is understood that when the disclosed compound has excess lithium, e.g., a lithium stoichiometry in excess of 4 in $Li_4Sr_2Zr_1O_6$, the excess lithium is accommodated in an interstitial crystallographic site, and the charge is compensated by valence of $Sr^{2+}$ or $Zr^{4+}$, lower valence species on $Sr^{2+}$ or $Zr^{4+}$, and/or a combination of different valances on Sr 2+, $Zr^{4+}$, and/or $O^{2-}$ sites as described by $d=(2-a)*x+(4-b)*y-(2-c)*z-h$, resulting in improved lithium conductivity. Also, further improvement may be provided by substitution of $Sr^{2+}$ by a cation with a valence of 1, 2 or 3, substitution of $Zr^{4+}$ by a cation with a valence of 2, 3, 4 or 5, and/or substitution of oxygen by an anion having a valence −3 or less, e.g., a nitrogen anion ($N^{3-}$). While not wanting to be bound by any particular theory, it is understood that, the substitution provides for an increased amount of excess lithium, resulting in improved lithium conductivity. It is understood that the increased lithium content results in unexpectedly reduced activation energy, which is responsible for the observed improved lithium conductivity.

In materials researched for solid-state electrolytes, sulfide-based materials have been found to have high ionic conductivities (>10 mS/cm). Examples of the sulfide-based materials for solid-state electrolytes may include $Li_2S—P_2S_5$, $Li_2S—P_2S_5—LiX$ (where X is a halogen element), $Li_2S—P_2S_5—Li_2O$, $Li_2S—SiS_2$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2P_2S_5—Z_mS_n$ (where m and n each are a positive number, and Z represents any of Ge, Zn, and Ga), $Li_2S—GeS_2$, $Li_2S—SiS_2—Li_3PO_4$, $Li_2S—SiS_2—Li_pMO_q$ (where p and q each are a positive number, M represents at least one of P, Si, Ge, B, Al, Ga, or In), $Li_{7-x}PS_{6-x}Cl_x$ (where $0 \le x \le 2$), $Li_{7-x}PS_{6-x}Br_x$ (where $0 \le x \le 2$), or $Li_{7-x}PS_{6-x}I_x$ (where $0 \le x \le 2$). However, the sulfide-based materials are not safe to use and have unsatisfactory electrochemical stability. For example, the sulfide-based materials may generate toxic gases (e.g., $H_2S$) during the production process, which then may get oxidized in air and forms elemental sulfur. In addition, when in contact with Li metal, it may react with Li to corrode the Li metal anode.

The compound represented by Formula 1 have better Li stability and is safer to use than sulfide-based materials. That is, the compound represented by Formula 1 provides both suitable ionic conductivity and electrochemical stability (e.g., is stable when in contact with Li metal). Non-limiting examples of the compounds represented by Formula 1 may include, 1) when $(4+d)/(1-y)>4:1$: $Li_4H_{0.25}Sr_2Zr_{0.875}Ba_{0.125}O_6$, $Li_4Sr_{1.25}K^{+1}{}_{0.75}Zr_{0.25}Ta^{+5}{}_{0.75}O_6$, $Li_4Sr_{1.75}Ca^{+2}{}_{0.25}Zr_{0.75}Sn^{+4}{}_{0.25}O_6$, $Li_4Sr_{1.0}Y^{+3}{}_{1.0}Zr_{0.5}Ba^{+2}{}_{0.5}O_6$, $Li_{4.25}Sr_{2.0}Zr_{0.875}M2^{+2}{}_{0.125}O_6$, $Li_{4.1875}Sr_{2.0}Zr_{0.75}M2^{+2}{}_{0.25}O_{5.9375}X^{-3}{}_{0.0625}$, $Li_{5.25}H_{0.5}Sr_{1.75}M1^{-1}{}_{0.25}Zr_{0.25}M2^{+2}{}_{0.75}O_6$, $Li_{5.75}Sr_{1.5}M1^{+1}{}_{0.5}Zr_{0.375}M2^{+2}{}_{0.625}O_6$, $Li_{4.9375}H_{0.75}Sr_{1.0}M1^{+1}{}_{1.0}Zr_{0.5}M2^{+2}{}_{0.5}O_{5.9375}X^{-3}{}_{0.0625}$, $Li_{6.5}Sr_{1.5}M1^{+1}{}_{0.5}M2^{+2}{}_{1.0}O_6$, $Li_{5.375}H_{0.25}M1^{+1}{}_{2.0}Zr_{0.75}M2^{+3}{}_{0.25}O_{5.875}X^{-3}{}_{0.125}$, $Li_{5.5}Sr_{0.5}M1^{+1}{}_{1.5}Zr_{1.0}O_6$, $Li_{5.25}H_{0.25}Sr_{0.5}M1^{+1}{}_{1.5}Zr_{1.0}O_6$, and $Li_{4.75}Sr_{1.0}M1^{+1}{}_{1.0}Zr_{0.75}M2^{+5}{}_{0.25}O_6$, 2) when $(4+d)/(6-z)>4/6$: $Li_{4.25}Sr_{2.0}Zr_{0.875}M2^{+2}{}_{0.125}O_6$, $Li_{4.5}Sr_{2.0}Zr_{0.75}M2^{+2}{}_{0.25}O_6$, $Li_{4.25}H_{0.25}Sr_{2.0}Zr_{0.75}M2^{+2}{}_{0.25}O_6$, $Li_{4.1875}Sr_{2.0}Zr_{0.75}M2^{+2}{}_{0.25}O_{5.9375}X^{-3}{}_{0.0625}$, $Li_{4.75}Sr_{2.0}Zr_{0.625}M2^{+2}{}_{0.375}O_6$, $Li_{4.5}H_{0.25}Sr_{2.0}Zr_{0.625}M2^{+2}{}_{0.375}O_6$, $Li_{4.25}H_{0.5}Sr_{2.0}Zr_{0.625}M2^{+2}{}_{0.375}O_6$, $Li_{5.25}Sr_{2.0}Zr_{0.375}M2^{+2}{}_{0.625}O_6$, $Li_{5.0}H_{0.25}Sr_{2.0}Zr_{0.375}M2^{+2}{}_{0.625}O_6$, $Li_{4.75}H_{0.5}Sr_{2.0}Zr_{0.375}M2^{+2}{}_{0.625}O_6$, $Li_{4.5}H_{0.75}Sr_{2.0}Zr_{0.375}M2^{+2}{}_{0.625}O_6$, $Li_{4.25}H_{1.0}Sr_{2.0}Zr_{0.375}M2^{+2}{}_{0.625}O_6$, $Li_{5.0}Sr_{2.0}Zr_{0.375}M2^{+2}{}_{0.625}O_6$, $Li_{4.75}H_{0.25}Sr_{2.0}Zr_{0.375}M2^{+2}{}_{0.625}O_6$, $Li_{4.5}H_{0.5}Sr_{2.0}Zr_{0.375}M2^{+2}{}_{0.625}O_6$, and $Li_{4.25}H_{0.75}Sr_{2.0}Zr_{0.375}M2^{+2}{}_{0.625}O_6$, etc., wherein $M1^{+1}$ is a monovalent cationic dopant for the Sr site, $M2^{+2}$ is a divalent cationic dopant for the Zr site, $M2^{+3}$ is a trivalent cationic dopant for the Zr site, $M2^{+5}$ is a pentavalent cationic dopant for the Zr site, and $X^{-3}$ is an trivalent anionic dopant for the O site, examples of each of which are the same as described above.

Figure 2:
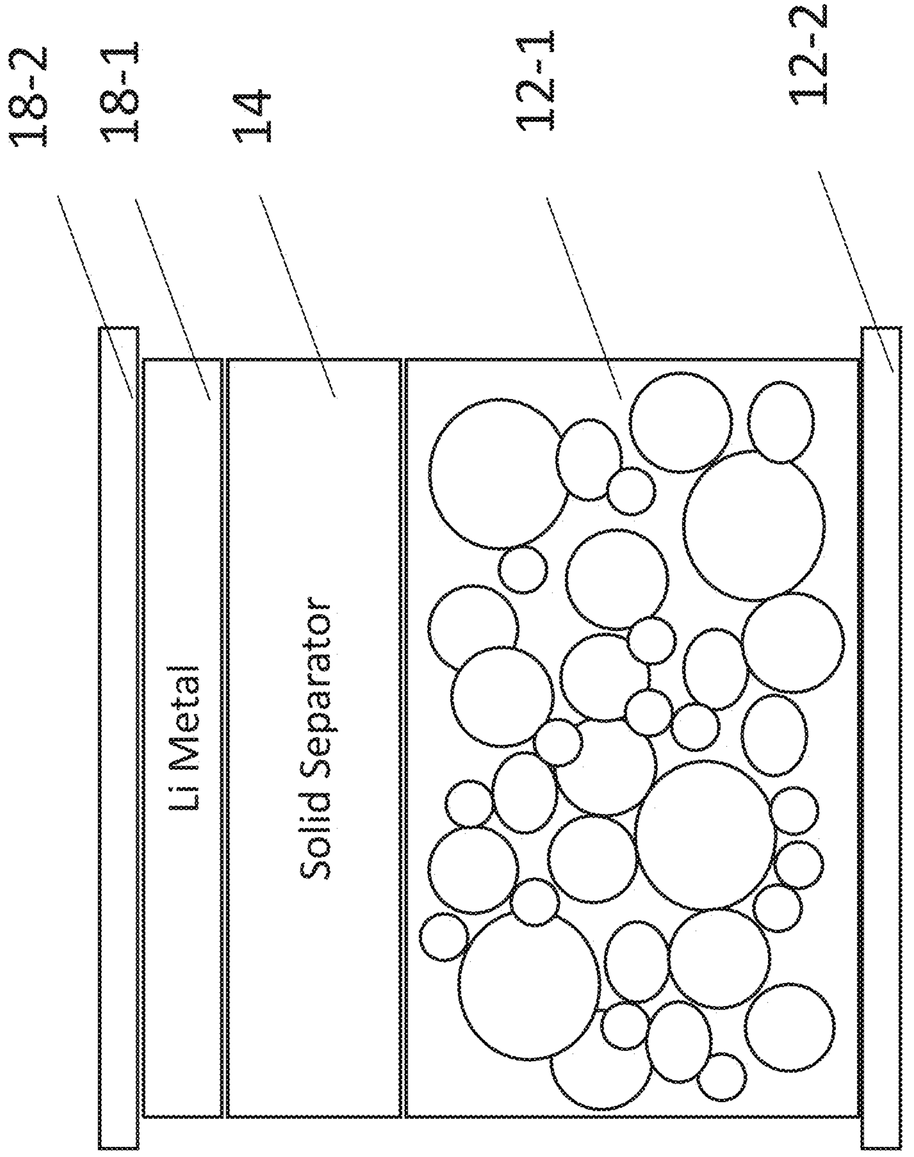
FIG. 2 is a schematic illustration of an electrochemical cell according to an embodiment of the present disclosure.

FIG. 2 is a schematic illustration of an electrochemical cell, such as a solid-state battery, according to an embodiment of the present disclosure. Referring to FIG. 2, the electrochemical cell includes a cathode (also referred to as positive electrode) 12, an anode (also referred to as negative electrode) 18, and a solid-state electrolyte (SSE) 14 between the cathode 12 and the anode 18.

The cathode 12 may include a positive active material layer 12-1 including a positive active material on a current collector 12-2. The current collector may include a suitable material, such as aluminum. The cathode 12 may be prepared by any suitable method, such as screen printing, slurry casting, or powder compression of the positive active material on the current collector. However, the method of preparing the cathode is not limited thereto, and any suitable method may be utilized. The positive active material may include any suitable material, such as a lithium transition metal oxide, a transition metal sulfide, or a combination thereof. Example positive active materials may include one or more compounds represented by the following formulas: $Li_aA_{1-b}R_bD_2$ ($0.90 \le a \le 1.8$ and $0 \le b \le 0.5$); $Li_aE_{1-b}R_bO_{2-c}D_c$ ($0.90 \le a \le 1.8$, $0 \le b \le 0.5$ and $0 \le c \le 0.05$); $LiE_{2-b}R_bO_{4-c}D_c$ ($0 \le b \le 0.5$, $0 \le c \le 0.05$); $Li_aNi_{1-c-b-c}Co_bR_cD_\alpha$ ($0.90 \le a \le 1.8$, $0 \le b \le 0.5$, $0 \le c \le 0.05$ and $0 < \alpha < 2$); $Li_aNi_{1-b-c}Co_bR_cO_{2-\alpha}Z_\alpha$ ($0.90 \le a \le 1.8$, $0 \le b \le 0.5$, $0 \le c \le 0.05$ and $0 < \alpha < 2$); $Li_aNi_{1-b-c}Co_bR_cO_{2-\alpha}Z_2$ ($0.90 \le a \le 1.8$, $0 \le b \le 0.5$, $0 \le c \le 0.05$ and $0 < \alpha < 2$); $Li_aNi_{1-b-c}Mn_bR_cD_\alpha$ ($0.90 \le a \le 1.8$, $0 \le b \le 0.5$, $0 \le c \le 0.05$ and $0 < \alpha \le 2$); $Li_aN_{1-b-c}Mn_bR_cO_{2-\alpha}Z_\alpha$ ($0.90 \le a \le 1.8$, $0 \le b \le 0.5$, $0 \le c \le 0.05$ and $0 < \alpha < 2$); $Li_aNi_{1-b-c}Mn_bR_cO_{2-\alpha}Z_2$ ($0.90 \le a \le 1.8$, $0 \le b \le 0.5$, $0 \le c \le 0.05$ and $0 < \alpha < 2$); $Li_aNi_bE_cG_dO_2$ ($0.90 \le a \le 1.8$, $0 \le b \le 0.9$, $0 \le c \le 0.5$ and $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 5$ and $0.001 \le e \le 0.1$); $Li_aNiG_bO_2$ ($0.90 \le a \le 1.8$ and $0.001 \le b \le 0.1$); $Li_aCoG_bO_2$ ($0.90 \le a \le 1.8$ and $0.001 \le b \le Li_aMnG_bO_2$ ($0.90 \le a \le 1.8$ and $0.001 \le b \le 0.1$); $Li_aMn_2G_bO_4$ ($0.90 \le a \le 1.8$ and $0.001 \le b \le 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \le f \le 2$); $Li_{(3-f)}Fe_2(PO_4)_3$($0 \le f \le 2$); and $LiFePO_4$.

In the above chemical formulas, A includes, but is not limited to, Ni, Co, Mn, or a combination thereof; R includes, but is not limited to Al, Ni, Co, Mn, Cr, Fe, Mg, Sr, V, a rare earth element, or a combination thereof; D includes, but is not limited to, O, F, S, P, or a combination thereof; E includes, but is not limited to, Co, Mn, or a combination thereof; Z includes, but is not limited to, F, S, P, or a combination thereof; G includes, but is not limited to, Al, Cr, Mn, Fe, Mg, La, Ce, Sr, V, or a combination thereof; Q includes, but is not limited to, Ti, Mo, Mn, or a combination thereof; T includes, but is not limited to, Cr, V, Fe, Sc, Y, or a combination thereof; and J includes, but is not limited to, V, Cr, Mn, Co, Ni, Cu, or a combination thereof.

The positive active material layer may include the positive active material and may further include a conductive agent and/or a binder. Any suitable conductive agent and binder may be utilized. A binder may facilitate adherence between components of the electrode, such as the positive active material and the conductor, and adherence of the electrode to a current collector. Examples of the binder may include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder may be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The conductive agent may include, for example, carbon black, carbon fiber, graphite, carbon nanotubes, graphene, or a combination thereof. The carbon black may be, for example, acetylene black, Ketjen black, Super P carbon, channel black, furnace black, lamp black, thermal black, or a combination thereof. The graphite may be a natural graphite or an artificial graphite. A combination including at least one of the foregoing conductive agents may be used. The positive electrode may additionally include an additional conductor other than the carbonaceous conductor described above. The additional conductor may be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative.

A positive electrode may be produced from a positive active material composition including a positive active material, and optionally, the conductive agent, and the binder. In an embodiment the positive active material composition is disposed on a current collector, such as an aluminum current collector to form a positive electrode. Screen printing, slurry casting, or powder compression may be utilized, the details of which may be determined by one of skill in the art without undue experimentation and are not further elaborated upon herein for clarity.

The anode 18 may include a negative active material layer 18-1 and a current collector 18-2. The negative active material may include a metal, a transition metal nitride, or a combination thereof. Examples of suitable materials for forming the anode 18 may include lithium (Li), gold (Au), copper (Cu), nickel (Ni), aluminum (Al), silver (Ag), titanium nitride (TiN), gallium nitride (GaN), molybdenum nitride (MoN), or a combination thereof. In some embodiments, the negative active material may include lithium metal, a lithium alloy, or a combination thereof. The current collector may be any suitable material, such as copper current collector.

The solid-state electrolyte (SSE) 14 may be an ionic conductor and an electronic insulator, and may include a compound for solid-state electrolyte represented by Formula 1. The solid-state electrolyte may include a layer formed from the compound represented by Formula 1, and the layer may be in direct contact with the anode and/or the cathode of the solid-state battery.

In some embodiments, the solid-state electrolyte may be formed utilizing the compound represented by Formula 1 as the main component, e.g., at more than 50%, 70% or 90% or more based on a total weight of the solid-state electrolyte. In an embodiment, the solid-state electrolyte may be formed utilizing only the compound represented by Formula 1. In an embodiment, the solid-state electrolyte may be in direct contact with both the anode and the cathode of the solid-state battery.

The compound of Formula 1 may be synthesized by combining a compound including lithium, a compound including strontium, a compound including zirconium, and at least one compound including M1, M2, or X, in suitable stoichiometric amount to form a mixture; and heat-treating the mixture to prepare the compound of Formula 1. In an embodiment, the method may further include acid treatment of the heat-treated product.

Examples compounds including lithium, strontium, zirconium, M1, and M2 may include oxides, nitrides, oxynitrides, nitrates, hydroxides, and/or carbonates of each of these elements. For example, lithium carbonate, lithium nitrate, strontium oxide, zirconium oxide, magnesium carbonate, magnesium oxide, aluminum carbonate, etc., may be utilized.

The compound including X may be a lithium salt including X. For example, when X is F, LiF may be utilized, or when X is Cl, LiCl may be utilized. The mixture may be heat treated in a suitable container, such as a crucible, at temperature between 700° C. and 1000° C. for two to 10 hours in air. The resulting material may be ground into a fine powder utilizing a ball-mill for 30 minutes. If desired, a wet process, such as wet-milling in methanol may be used. The dried powder may again be treated at an appropriate temperature between 700° C. and 1000° C. for 2 to 24 hours to provide the desired phase. The product may be reground, e.g., by ball-milling if desired, to provide a suitable form. The particle size of the ball-milled powder may be smaller than 1 μm, or smaller than 5 μm. The ball-milled powder may be mixed with a suitable amount of a 3 weight percent (wt %) polyvinylalcohol (PVA) solution if desired, or pressed into a pellet without the PVA at a pressure between 1 and 10 tons. The pellet may be sintered for 2 to 4 hours in air at a temperature ranging from 1000° C. to 1300° C.

The compound represented by Formula 1 may be in the form of a particle. The particle may have, for example, a spherical form, an oval-spherical form, and/or the like. The particle diameter is not particularly limited, and a mean particle diameter may be, for example, from 0.01 to 50 μm, 0.1 to 25 μm, or 0.2 μm to 10 μm. A mean particle diameter refers to a number average diameter (D50) of the particle size distribution of particles obtained by scattering, or the like. The particle may be processed, for example, by mechanical milling, to provide a suitable particle size.

In some embodiments, a film including the compound of Formula 1 may be provided on a release layer, the film disposed on at least one of the negative electrode and the positive electrode, the release layer removed, and then the negative electrode disposed on the positive electrode to manufacture the battery.

This disclosure is further illustrated by the following examples, which are non-limiting. In the examples, the activation energy and ionic conductivity were determined by ab-initio molecular dynamics (AIMD) based on density functional theory (DFT). First-principles calculations were performed utilizing density functional theory as implemented in the plane-wave-basis-set Vienna ab initio simulation package (VASP). Projector augmented wave potentials with kinetic energy cutoff of 520 eV were employed in all structural optimizations and total-energy calculations, and the Exchange and correlation functionals were described within Perdew-Burke-Ernzerhof generalized gradient approximation (GGA-PBE). A k-point density of at least 500 per number of atoms in the unit cell was used in all calculations.

The simulations were taken on the canonical ensemble with a time step of 2 femtoseconds (fs), and the temperature was initialized at 100 Kelvin (K) and elevated to the appropriate temperature (600, 720, 900, 1200 and 1500 K) with simulations lasting 200 picoseconds (ps) for statistical analysis. A gamma-point-only sampling of k-space and a lower but sufficient plane-wave energy cutoff than the structural optimization calculation was used.

Example 1

Figure 3:
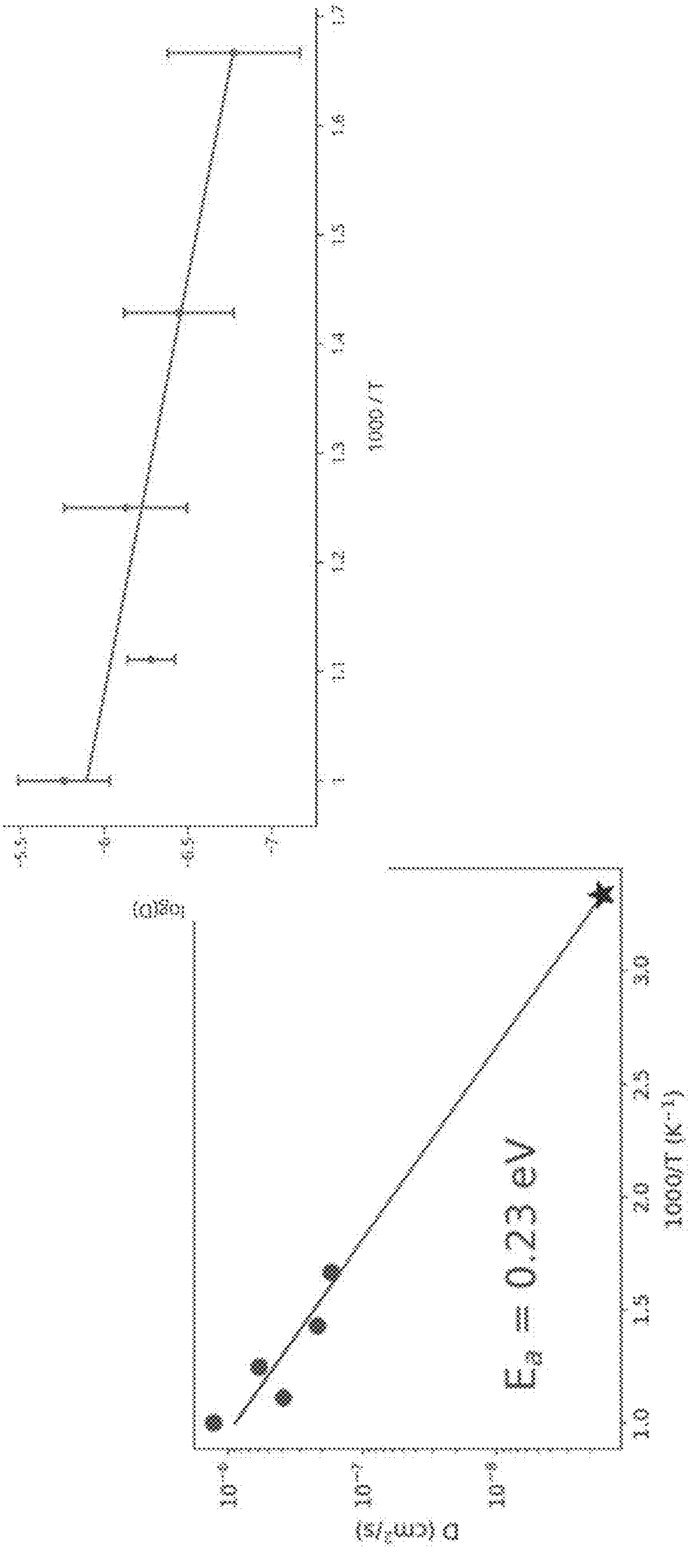
FIG. 3 is an Arrhenius plot of Li-ion diffusivity of a compound according to Example 1 of the present disclosure.

An Arrhenius plot of Li-ion diffusivity was calculated for $Li_{4.5}Sr_{1.5}K_{0.5}ZrO_6$ and the result thereof is shown in FIG. 3. As shown in FIG. 3, this example compound according to embodiments of the present disclosure has an activation energy $E_a$ of 0.23 eV, and a Li-ion conductivity of about 0.415 mS/cm at 300 K.

Comparative Example 1

Figure 4:
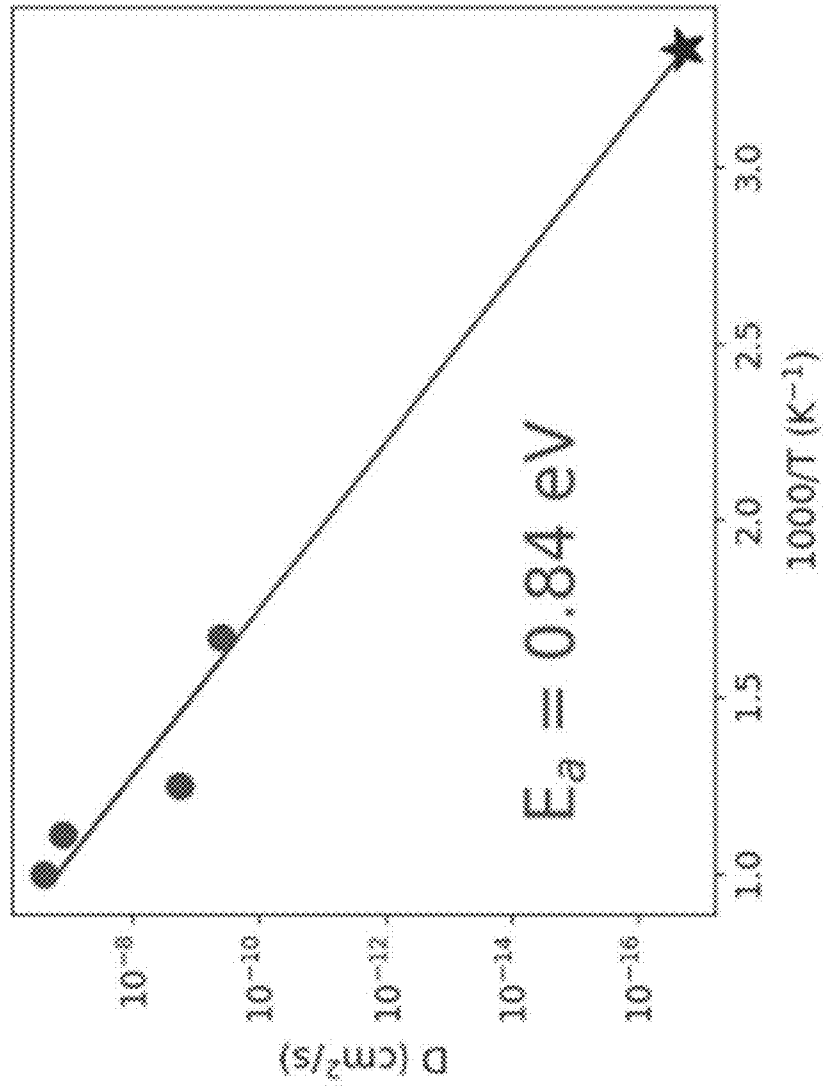
FIG. 4 is an Arrhenius plot of Li-ion diffusivity of a compound according to Comparative Example 1.

An Arrhenius plot of Li-ion diffusivity was calculated for $Li_{3.957}Sr_{1.957}La_{0.043}ZrO_6$ similarly to Example 1 and the result thereof is shown in FIG. 4. As shown in FIG. 4, this comparative material has $E_a$ of 0.84 eV, and a Li-ion conductivity of less than $1\times10^{-6}$ mS/cm at 300 K.

Comparing Example 1 with Comparative Example 1, by including excess amount of lithium (relative to the LSZO base compound) in the compound according to embodiments of the present disclosure and by adding dopants (for example, $K^{1+}$0 dopants in the $Sr^{2+}$ sites), the compound according to embodiments of the present disclosure enables fast $Li^+$ diffusion and therefore shows much greater ionic conductivities than the Comparative Example 1.

Without being bound by any particular theory, it is believed that in Comparative Example 1 utilizing $Li_{3.75}Sr_{1.75}La_{0.25}ZrO_6$, when $La^{3+}$ is utilized as dopant in the $Sr^{2+}$ sites, it creates Li deficiency in the material, which yields higher $Li^+$ activation energy and therefore a very low $Li^+$ ionic conductivity.

Example 2—Thermodynamic Stability of Compounds

The thermodynamic stability of compounds according to embodiments of the present disclosure are calculated utilizing high-throughput density functional theory (DFT) calculations. Table 2 lists example dopants considered for doping the Sr sites and the Zr sites. For example, dopants M1 selected from groups (or sets) A, B and C are utilized to dope the $Sr^{2+}$ sites, and dopants M2 selected from groups (or sets) C, D and E are utilized to dope the $Zr^{4+}$ sites to produce various compounds represented by $Li_{4+d}H^+_hSr_{2-x}M1^{a+}_xZr_{1-y}M2^{b+}_yO_{6-z}X^{c-}_z$. In these example compounds, Li stoichiometry is fixed at 4, O stoichiometry is fixed at 6, Sr stoichiometry is 2 or less, and Zr stoichiometry is 1 or less.

The phase stability of predicted materials was estimated by calculating the energy above the linear combination of stable phases in the first principle phase diagram, also known as the energy above hull ($E_{hull}$). For phase diagram construction, the energies of all compounds other than those of direct interest in this work were obtained from the Materials Project utilizing the Materials Application Programming Interface (API). To assert a threshold value beyond which predicted materials in $Li_{4+d}H^+_hSr_{2-x}M1^{a+}_xZr_{1-y}M2^{b+}_yO_{6-z}X^{c-}_z$ are deemed unstable, the ideal configurational entropy ($S_{idea}=-K_b\Sigma_i p_i \ln p_i$) is considered, where $K_b$ is the Boltzmann constant, $p_i$ is the probability of each state (occupied or unoccupied) and the sum is over all states for each site. It is noted that co-doping both $Zr^{4+}$ and $Sr^{2+}$ (e.g., concurrently) leads to an increased configurational entropy and hence facilitates the synthesis of phases with substantially larger $E_{hull}$ values. Here, a threshold $E_{hull}$ of 100 meV/atom is adopted.

Example compounds that meet the threshold $E_{hull}$ of 100 meV/atom include D-Li—O—Sr, C-E-Li—O—Sr, D-Li—O—Sr—Zr, B-D-Li—O—Sr, A-B-D-E-Li—O, A-B-E-Li—O—Zr, A-E-Li—O—Sr—Zr, A-B-E-Li—O, A-B-E-Li—O—Sr, B-D-Li—O—Sr—Zr, B—Li—O—Sr—Zr, C—E-Li—O—Sr—Zr, B—C-D-E-Li—O, B—C—E-Li—O—Sr, A-D-E-Li—O—Sr, C-D-E-Li—O—Sr, A-B—C—E-Li—O, A—C—E-Li—O—Sr, B—C—E-Li—O, A—E-Li—O—Sr, B-D-Li—O—Zr, B-D-Li—O, B—C—E-Li—O—Zr, B—Li—O—Zr, and A—C—Li—O—Zr. Here, A, B, C, D and E are selected from species shown in Table 2, and the stoichiometric range for each of these species to produce a compound with the desirable $E_{hull}$ are also listed in Table 2. For example, compound represented by D-Li—O—Sr may be a Sn—Li—O—Sr compound with Sn included at a stoichiometric range of 0 to 1.

TABLE 2

| Specie Set | Specie | Stoichiometric Range (normalized per site) |
|---|---|---|
| A | $Na^{+}$ | [0, 0.5] |
| A | $K^{+}$ | [0, 0.5] |
| B | $Sr^{2+}$ | [0, 1] |
| B | $Ba^{2+}$ | [0, 1] |
| B | $Mg^{2+}$ | [0, 0.9375] |
| B | $Ca^{2+}$ | [0, 1] |
| B | $Zn^{2+}$ | [0, 1] |
| C | $Y^{3+}$ | [0, 0.5] |
| C | $In^{3+}$ | [0, 0.5] |
| C | $Sc^{3+}$ | [0, 0.5] |
| D | $Zr^{4+}$ | [0, 1] |
| D | $Sn^{4+}$ | [0, 1] |
| D | $Ti^{4+}$ | [0, 1] |
| D | $Ge^{4+}$ | [0, 1] |
| D | $Si^{4+}$ | [0, 1] |
| E | $Bi^{5+}$ | [0, 1] |
| E | $Sb^{5+}$ | [0, 1] |
| E | $Ta^{5+}$ | [0, 0.75] |
| E | $Nb^{5+}$ | [0, 0.75] |
| E | $As^{5+}$ | [0, 0.75] |
| E | $P^{5+}$ | [0, 0.75] |

Figure 5:
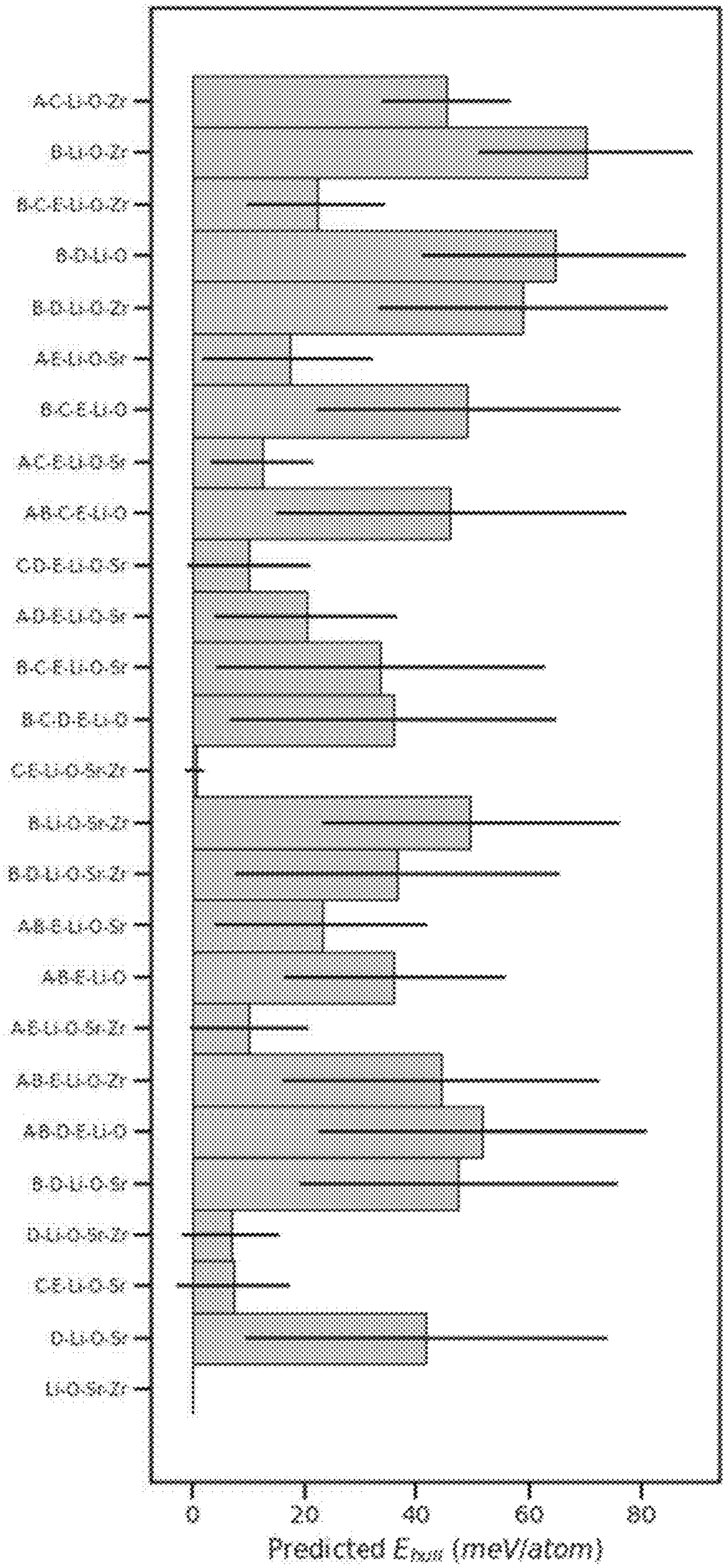
FIG. 5 shows the average and standard deviation $E_{hull}$ for chemical compounds according to one or more embodiments of the present disclosure.

FIG. 5 shows the predicted $E_{hull}$ for various example compounds. As can be seen from FIG. 5, all of the compounds represented by the Formulae above have an average $E_{hull}$ lower than 100 meV/atom.

While this invention has been described in detail with particular references to example embodiments thereof, the example embodiments described herein are not intended to be exhaustive or to limit the scope of the disclosure to the exact forms disclosed. Persons skilled in the art and technology to which this invention pertains will appreciate that alterations and changes in the described structures and methods of assembly and operation may be practiced without meaningfully departing from the principles, spirit, and scope of this invention, as set forth in the following claims, and equivalents thereof.

What is claimed is:

1. A compound represented by Formula 1:

$$Li_{4+d}H_h^{+}Sr_{2-x}M1_x^{a+}Zr_{1-y}M2_y^{b+}O_{6-z}X_z^{c-}, \quad \text{Formula 1}$$

wherein in Formula 1, MI is a cationic dopant in Sr site with a valance of a+; a is 1, 2 or 3;

M2 is a cationic dopant in Zr site with a valance of b+; b is 2, 3, 4, or 5; X is an anion dopant in 0 site with a valence of c−; c is 1, 2, or 3;

$$0 \leq h \leq 2,\ 0 \leq x \leq 2,\ 0 \leq y \leq 1,\ 0 \leq z \leq 0.5,\ x+y+z+h \geq 0,$$

$$d = (2-a)^{*}x + (4-b)^{*}y - (2-c)^{*}z - h, \text{ and}$$

$$d \geq 0.$$

2. The compound of claim 1, wherein a stoichiometric ratio between Li and Zr represented by (4+d):(1−y) is greater than 4:1.

3. The compound of claim 1, wherein a stoichiometric ratio between Li and O represented by (4+d):(6−z) is greater than 4:6.

4. The compound of claim 1, wherein $0<y\leq 1$.

5. The compound of claim 1, wherein M1 is $Na^{1+}$, $K^{1+}$, $Rb^{1+}$, $Cs^{1+}$, $Fr^{1+}$, $Ca^{2+}$, $Ba^{2+}$, $Mg^{2+}$, $Zn^{2+}$, $Be^{2+}$, $Ra^{2+}$, $In^{3+}$, $Sc^{3+}$, $Y^{3+}$, $Al^{3+}$, $Ga^{3+}$, $B^{3+}$, or any combination thereof.

6. The compound of claim 1, wherein M2 is $Ca^{2+}$, $Ba^{2+}$, $Mg^{2+}$, $Zn^{2+}$, $Be^{2+}$, $Y^{3+}$, $In^{3+}$, $Sc^{3+}$, $B^{3+}$, $Al^{3+}$, $Ga^{3+}$, $Ce^{3+}$, $Pr^{3+}$, $Nd^{3+}$, $Gd^{3+}$, $Ti^{4+}$, $Sn^{4+}$, $Si^{4+}$, $Ge^{4+}$, $Pb^{4+}$, $Bi^{5+}$, $Sb^{5+}$, $P^{5+}$, $As^{5+}$, $Nb^{5+}$, $Ta^{5+}$, or any combination thereof.

7. The compound of claim 1, wherein X is $F^{1-}$, $Cl^{1-}$, $Br^{1-}$, $I^{1-}$, $N^{3-}$, or any combination thereof.

8. The compound of claim 1, wherein the compound has an ionic conductivity of about 0.3 mS/cm or greater at room temperature.

9. The compound of claim 1, wherein a is 1 or 2 and b is 2, 3, or 4.

10. A solid-state electrolyte, comprising the compound of claim 1.

11. The solid-state electrolyte of claim 10, wherein a stoichiometric ratio between Li and Zr represented by (4+d):(1-y) is greater than 4:1.

12. The solid-state electrolyte of claim 10, wherein a stoichiometric ratio between Li and O represented by (4+d):(6-z) is greater than 4:6.

13. An electrochemical cell, comprising:

an anode comprising a lithium metal, a cathode facing the anode, and a solid-state electrolyte between the anode and the cathode, the solid-state electrolyte comprising the compound of claim 1.

14. The electrochemical cell of claim 13, wherein a stoichiometric ratio between Li and Zr represented by (4+d):(1−y) is greater than 4:1.

15. The electrochemical cell of claim 13, wherein a stoichiometric ratio between Li and O represented by (4+d):(6−z) is greater than 4:6.

16. A method of manufacturing the compound of claim 1, the method comprising:

combining a lithium source with two or more selected from the group consisting of a strontium source, a zirconium source, a source of M1, a source of M2 and a source of X, to form a mixture, and heat treating the mixture to manufacture the compound.

17. The method of claim 16, wherein a stoichiometric ratio between Li and Zr represented by (4+d):(1−y) is greater than 4:1.

18. The method of claim 16, wherein a stoichiometric ratio between Li and O represented by (4+d):(6−z) is greater than 4:6.

19. A compound represented by Formula 1:

$$Li_{4+d}H_h^{+}Sr_{2-x}M1_x^{a+}Zr_{1-y}M2_y^{b+}O_{6-z}X_z^{c-}, \quad \text{Formula 1}$$

wherein in Formula 1, M1 is a cationic dopant in Sr site with a valance of a+; a is 1, 2 or 3;

M2 is a cationic dopant in Zr site with a valance of b+; b is 2, 3, 4, or 5; X is an anion dopant in O site with a valence of c−; c is 1, 2, or 3;

$$0 \leq h \leq 2,\ 0 < x \leq 2,\ 0 \leq y \leq 1,\ 0 \leq z \leq 0.5,\ x+y+z+h \geq 0, \text{ and wherein}$$

$$d = (2-a)^{*}x + (4-b)^{*}y - (2-c)^{*}z - h \text{ and } d \geq 0.$$

* * * * *